United States Patent
Barraco et al.

(10) Patent No.: US 12,040,655 B2
(45) Date of Patent: Jul. 16, 2024

(54) METHOD FOR CONTROLLING AN ELECTRICAL POWER SUPPLY NETWORK FOR AN AIRCRAFT

(71) Applicant: SAFRAN HELICOPTER ENGINES, Bordes (FR)

(72) Inventors: Thomas Barraco, Moissy-Cramayel (FR); Thomas Klonowski, Moissy-Cramayel (FR); Vincent Poumarede, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 518 days.

(21) Appl. No.: 17/603,202

(22) PCT Filed: Apr. 10, 2020

(86) PCT No.: PCT/FR2020/000115
§ 371 (c)(1),
(2) Date: Oct. 12, 2021

(87) PCT Pub. No.: WO2020/212655
PCT Pub. Date: Oct. 22, 2020

(65) Prior Publication Data
US 2022/0185497 A1  Jun. 16, 2022

(30) Foreign Application Priority Data
Apr. 17, 2019 (FR) ........................... 1904095

(51) Int. Cl.
*H02J 7/00* (2006.01)
*H02J 7/34* (2006.01)

(52) U.S. Cl.
CPC ........... *H02J 7/345* (2013.01); *H02J 2310/44* (2020.01)

(58) Field of Classification Search
None
See application file for complete search history.

(56) References Cited

U.S. PATENT DOCUMENTS

| 5,483,142 A |   | 1/1996 | Skibinski et al. |
| 5,678,646 A | * | 10/1997 | Fliege ............... H02K 9/19 310/112 |

(Continued)

FOREIGN PATENT DOCUMENTS

| DE | 102015116154 A1 | 5/2016 |
| FR | 2981225 A1 | 4/2013 |

OTHER PUBLICATIONS

International Search Report mailed on Jul. 20, 2020, issued in corresponding International Application No. PCT/FR2020/000115, filed on Apr. 10, 2020, and its English translation thereof, 5 pages.

(Continued)

*Primary Examiner* — Arun C Williams
(74) *Attorney, Agent, or Firm* — Christensen O'Connor Johnson Kindness PLLC

(57) ABSTRACT

Methods for controlling an electrical power supply network for an aircraft, include pre-charging at least one capacitor in a normal operating mode when a gas turbine is available, pre-charging the at least one capacitor in a backup operating mode when the gas turbine is not available, and discharging the at least one capacitor at the end of use of the electrical power supply network when the at least one capacitor is charged.

9 Claims, 4 Drawing Sheets

(56) References Cited

U.S. PATENT DOCUMENTS

| | | | | |
|---|---|---|---|---|
| 7,400,116 | B2* | 7/2008 | Kato | H02P 27/08 |
| | | | | 320/166 |
| 10,074,974 | B2* | 9/2018 | Prochaska | H02H 3/202 |
| 10,345,348 | B2 | 7/2019 | Gobbi et al. | |
| 2005/0231172 | A1* | 10/2005 | Kato | B60L 50/51 |
| | | | | 320/166 |
| 2008/0174177 | A1 | 7/2008 | Langlois et al. | |
| 2010/0308582 | A1* | 12/2010 | Rozman | H02P 9/102 |
| | | | | 290/31 |
| 2018/0210488 | A1* | 7/2018 | Kiya | G07C 5/00 |

OTHER PUBLICATIONS

Written Opinion of the International Searching Authority, mailed on Oct. 22, 2020, issued in corresponding International Application No. PCT/FR2020/000115, filed on Apr. 10, 2020, and its English translation thereof, 9 pages.

* cited by examiner

METHOD FOR CONTROLLING AN ELECTRICAL POWER SUPPLY NETWORK FOR AN AIRCRAFT

CROSS-REFERENCE TO RELATED APPLICATIONS

This application is a National Stage of International Application No. PCT/FR2020/000115, filed Apr. 10, 2020, which claims priority to French Patent Application No. 1904095, filed Apr. 17, 2019, the entire disclosures of which are hereby incorporated by reference.

TECHNICAL FIELD OF THE INVENTION

The present invention relates to the field of the electrical power supply for an aircraft. It relates to a method for controlling an electrical energy power supply network for an aircraft.

The present invention is used in particular in the context of electrical architectures integrating power sources comprising a gas turbine associated with a generator forming a turbogenerator, and loads or consumers of electrical energy such as electrical thrusters.

The present invention is not directed to any particular aircraft and can be applied to both stationary wing aircraft and rotary wing aircraft of the helicopter or multicopter type.

BACKGROUND

The prior art comprises, but is not limited to, the documents US-A1-2008/174177, DE-A1-10 2015 116 154, U.S. Pat. No. 5,483,142 and FR-A1-2 981 225 A1.

In a known way, the propulsion of the aircrafts is done today by means of gas turbines mechanically coupled to propulsion elements, in particular a fan for a modern turbofan engine, a propeller for a turboprop or a rotor for the turboshaft engines, particularly for the helicopter turboshaft engines.

It is known to couple a turbomachine with an electric current generator and an electric motor for driving a thruster, thus forming a propulsion system.

Thus, with reference to FIG. 1, a High Voltage Direct Current (HVDC) electrical power supply network 1 has been proposed, having at least one rectifier 2 at the output of an alternative current generator 3, followed by a plurality of electrical loads 4 to be powered (comprising, for example, an inverter at the input of an electric motor, in order to deliver an alternative current at the output of the inverter for the electrical power supply of the electric motor), the at least one rectifier 2 and the electric loads 4 being connected to a distribution bus 5.

For such an electrical architecture, the number of energy power sources and electrical loads to be powered is known, so that the main function of such an electrical power supply network is to guarantee the adequate voltage level on the HVDC electrical power supply network and to provide the necessary power whatever the demand of the electrical loads to be powered. The energy power sources and the electrical loads to be powered are connected on an HVDC distribution bus.

Such distribution buses comprise capacitors in order to filter the voltage supplied to the various electrical loads connected to the distribution bus and in particular to the converters. These capacitors must therefore be pre-charged (in other words these capacitors must have a sufficient initial level of electrostatic energy) before the electrical power supply network is powered-on (i.e. before the energy power sources apply a voltage), in order to avoid breaking these capacitors or systems connected to these capacitors, rendering the HVDC electrical power supply network unusable. In fact, a sudden power-on of a discharged capacitor is equivalent to creating a short-circuit current that can cause significant damage.

Thus, with reference to FIG. 2, it has been proposed to use an annexed resistive pre-charging circuit 6 connected to the terminals of a capacitor 7 of a distribution bus 5 in order to pre-charge it with electrical energy from a direct voltage source 2, for example a battery or a diode rectifier, before the inverter 8 which drives the electric motor 4 is powered-on. This pre-charge circuit 6 allows to control a voltage rise to limit the currents in the capacitor 7 thanks to a resistor, which is then short-circuited by a power switch in normal operation, once the pre-charge is completed.

In addition, when the distribution bus 5 is powered-off, a discharge circuit 3 implementing resistors and a power switch is used in parallel with the distribution bus 5 in order to ensure the safety of the electrical network, in particular in the event of human intervention, for example for maintenance work. This discharge circuit allows to ensure the discharge of the capacitor 7 in order to evacuate the energy stored in the capacitor 7 in the form of Joule effect in the resistance of the discharge circuit, until a certain acceptable voltage threshold is reached.

A disadvantage of these capacitor 7 pre-charge and discharge circuits is that they are carried on board the aircraft when not in use during the flight phases of the aircraft so that they constitute an unnecessary extra weight carried on board the aircraft. However, one of the aims of improving the aerodynamic performance is to reduce the weight carried on board as much as possible.

Solutions have been proposed allowing the pre-charge and discharge circuits to not be carried on board the aircraft. These solutions comprise dedicated systems that are not intended to be carried on board the aircraft but remain on the ground, but still require a connecting device to the distribution bus, so that a connection interface and its connectors must always be carried on board the aircraft.

It is an aim of the present invention to provide a simple and effective solution to the above-mentioned disadvantages.

SUMMARY OF THE INVENTION

To this end, the invention relates to a method for controlling an electrical power supply network for an aircraft comprising:
- at least one generator of a turbo-alternator of the aircraft adapted to provide a source of electrical energy from a gas turbine and comprising at least one stator associated with a rectifier,
- at least one distribution bus comprising at least one capacitor,
- at least one electric motor to be powered associated with an inverter, and
- at least one energy storage means, characterized in that it comprises the steps of:
- pre-charging the at least one capacitor in normal operating mode prior to power-on the electrical power supply network when the at least one capacitor is discharged and the gas turbine is available, and
- pre-charging the at least one capacitor in a backup operating mode prior to power-on the electrical power supply network when the at least one capacitor is discharged and the gas turbine is not available, and discharging the at least one capacitor at the end of use of the electrical power supply network when the at least one capacitor is charged.

Advantageously, in normal operating mode, the step of pre-charging the at least one capacitor is carried out by rotating the gas turbine until a voltage of the generator reaches a predetermined threshold voltage, the turbine then being in nominal operation.

According to an interesting embodiment, the pre-charging of the at least one capacitor is carried out by means of a diode bridge of the rectifier.

Thus, the pre-charge is done using the elements already present on the network, without requiring a dedicated circuit.

Preferably and advantageously, the electrical power supply network is powered-on when the at least one capacitor is pre-charged.

Preferably and advantageously, the voltage of the distribution bus is adapted to the no-load voltage of the at least one electrical storage device when power-on, so as to avoid the generation of circulation current peaks.

Advantageously, in the backup operating mode, the step of pre-charging the at least one capacitor is carried out by changing the electromotive force of the at least one electric motor and by controlling the associated inverter so as to transform a kinetic energy of the electric motor into electrical energy.

Advantageously, the discharge step is carried out by dissipating the electrical energy of the at least one capacitor by means of the impedance of the electrical power supply network.

According to an example of implementation, the dissipation of the electrical energy of the at least one capacitor is obtained by connecting, in series, stator resistors, via the control of the converters, of the at least one electric motor and of the at least one generator.

Preferably and advantageously, the step of pre-charging the at least one capacitor in the backup operating mode comprises a preliminary step of disconnecting the at least one electrical storage device. If a controllable direct current/direct current (DC/DC) converter of the buck/boost type is present between the buffer storage device, i.e. the battery, and the capacitor, it is also possible to control the current injection, i.e. the voltage rise across the terminals of the capacitor (not shown), which also ensures the HVDC bus pre-charge function.

The control method according to the invention allows to ensure, independently, the functions of:

pre-charging the capacitors in normal operating mode, before an initial power-on of the network, using the rotation of the gas turbine;

discharging the capacitors at the end of use of the network, using the impedance of the network to dissipate the energy stored in the capacitor to ensure the safety of the network and the staff brought to intervene on the network;

pre-charging the capacitors following a reconfiguration of the network, using the inertial kinetic energy induced by the rotation of the rotors of the electric motors, in flight.

Thus, the control method according to the invention allows to free itself from the dedicated pre-charge and discharge circuits of the capacitor in order to reduce the on-board mass of the aircraft and to improve the aerodynamic efficiency of the aircraft, while ensuring the charging and discharging functions necessary either as a prerequisite for the proper operation of the aircraft, or for safety reasons.

BRIEF DESCRIPTION OF FIGURES

Further characteristics and advantages of the invention will become apparent from the following detailed description, for the understanding of which reference is made to the attached drawings in which.

DETAILED DESCRIPTION OF THE INVENTION

Figure 1:
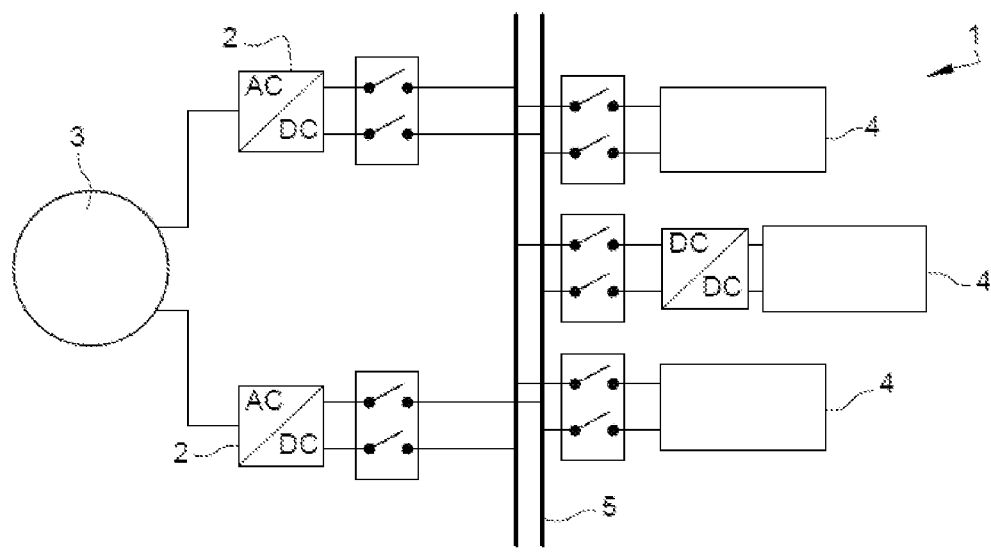
FIG. 1, previously discussed, illustrates an example of HVDC electrical network comprising a plurality of electrical loads connected to a distribution bus.
Figure 2:
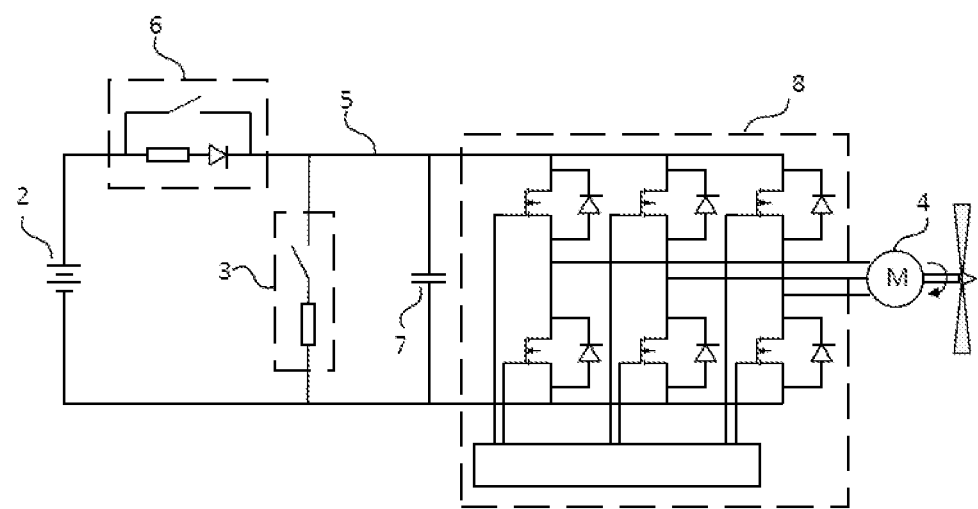
FIG. 2, already discussed, illustrates an HVDC electrical network according to the prior art comprising a pre-charge circuit, as well as a discharge circuit.
Figure 3:
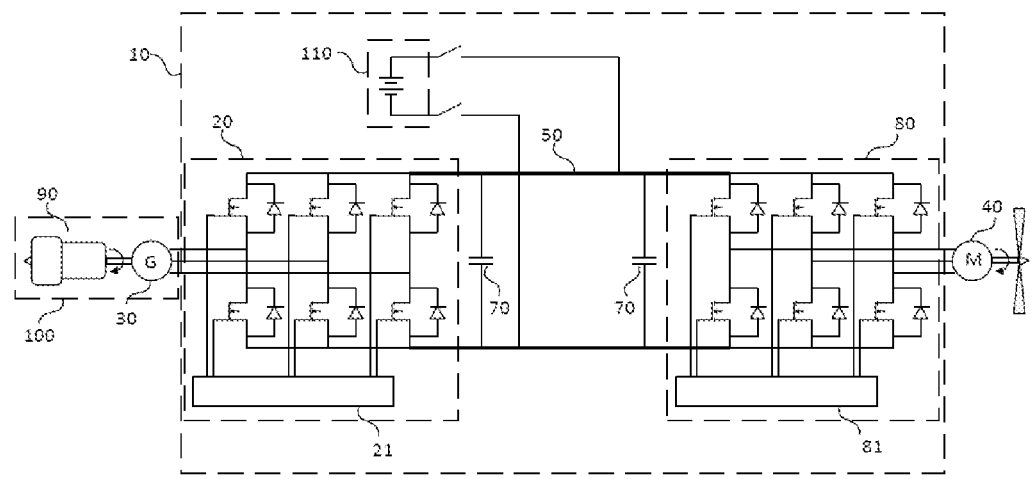
FIG. 3 illustrates an HVDC electrical network with no dedicated pre-charge or discharge circuit.

FIG. 3 illustrates an HVDC electrical network 10 of an aircraft comprising:

a generator 30 of a turbo-alternator 100 of the aircraft adapted to provide a source of electrical energy from a gas turbine 90 and comprising at least one stator associated with an active rectifier 20 comprising a control device 21, at least one distribution bus 50 comprising a plurality of capacitors 70 (at least one capacitor for each power converter connected to the distribution bus 50);

at least one electric motor 40 to be powered, driving for example a propeller or a rotor intended to ensure the propulsion of the aircraft, associated with an inverter 80 comprising a control device 81, and at least one energy storage means 110 which may be a battery, a super capacitance, etc.

The control method according to the invention comprises the steps of:

pre-charging the capacitors 70 in normal operating mode prior to power-on the electrical power supply network 10 when the capacitors 70 are discharged and the gas turbine is available, pre-charging the capacitors 70 in the backup operating mode prior to power-on the electrical power supply network 10 when the capacitors 70 are discharged and the gas turbine is not available, and discharging the capacitors 70 at the end of use of the electrical power supply network 10 when the capacitors 70 are charged.

Figure 4A:
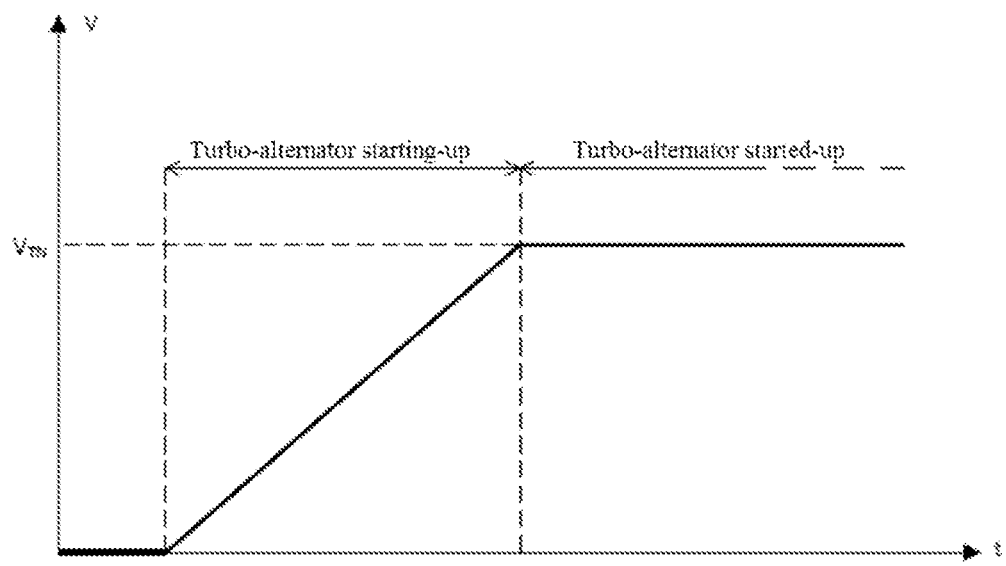
FIG. 4a is a time diagram illustrating the climb speed profile of the rotation of an aircraft turbine.
Figure 4B:
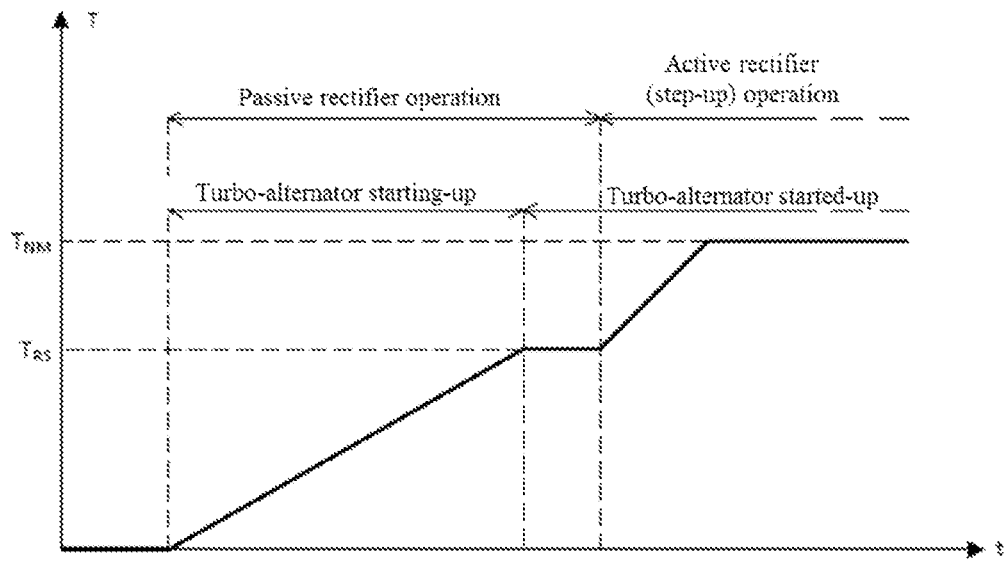
FIG. 4b is a time diagram illustrating the evolution of the output voltage of the rectifier.
Figure 5:
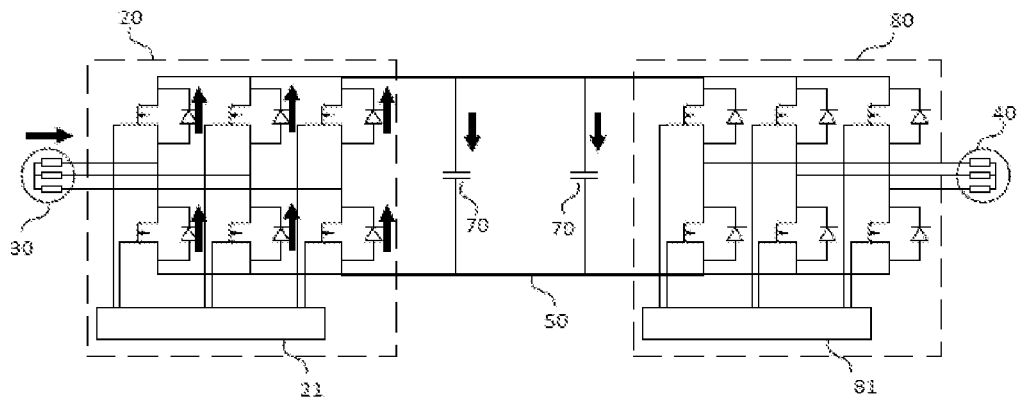
FIG. 5 illustrates the transfer of electrical energy from the generator to the capacitors of the HVDC network during the pre-charge step in normal operating mode.

More specifically, with reference to FIGS. 4a to 5, for the step of pre-charging the capacitors 70 in normal operating mode, initially, capacitors 70 are discharged, the gas turbine is off and no electrical storage device is connected. The pre-charged of the capacitors 70 is carried out by starting and rotating the gas turbine.

Thus, as shown in FIG. 4a, the rotational speed of the gas turbine (denoted V) gradually increases during start-up until it reaches a nominal speed $V_{TN}$. This initial climb speed phase has a duration (noted t) of the order of several tens of seconds.

Since the gas turbine output shaft is directly connected to the rotor of the generator 30, the rotational speed of the generator 30 is therefore proportional to that of the gas turbine. According to an example implementation, a reduction stage may be arranged between the gas turbine and the generator 30.

In a first operating phase corresponding to the start-up of the gas turbine, the active rectifier 20 being uncontrolled and operating as a diode rectifier (passive), the output voltage of the rectifier 20 is linked to the speed of rotation of the rotor of the generator 30 and in particular, in the case of a generator 30 of the synchronous machine with magnets type, the output voltage of the rectifier 20 is proportional to the speed of rotation of the rotor of the generator 30.

FIG. 4b shows that the output voltage of the rectifier 20 (noted T) increases during a first phase corresponding to the start-up of the gas turbine, until it reaches a threshold value $T_{RS}$. During the first phase of voltage rise of the reduction gearbox 20, the voltage of the distribution bus 50 (resulting from the passive rectification by the anti-parallel diodes of the rectifier 20 of the alternative voltage supplied by the stator phases of the generator 30) is not sufficient to allow direct control of the voltage of the distribution bus.

When the voltage supplied by the rectifier reaches the threshold voltage $T_{RS}$, a control device 21 of the rectifier 20 in active rectifier (step-up) can be used to regulate the voltage of the distribution bus 50.

In a second operating phase, the output voltage of the rectifier 20 being controlled by the control device 21 and independent of the speed of the gas turbine, the rectifier 20 driven as an active rectifier then allows to recharge the capacitors 70 of the distribution bus 50 up to its nominal voltage $T_{NM}$ (as represented by the arrows in FIG. 5).

When the electrical network 10 is powered-on, it is advisable to adapt the voltage $T_{NM}$ of the distribution bus 50 to the no-load voltage of the electrical storage device or the electrical storage devices 110 connected to the distribution bus 50 so as to avoid the generation of circulation current peaks.

When the electrical network 10 is not in use, the gas turbine 90 is no longer rotating and the generator 30 is switched-off and the electrical storage member 110 is isolated from the distribution bus 50, so that the voltage of the electrical network 10 adapts to the voltage imposed by the capacitors 70. The battery is disconnected so that the capacitors can be discharged. In particular, the energy stored in a battery is greater, for example a thousand times greater, than that stored in a capacitor.

Figure 6:
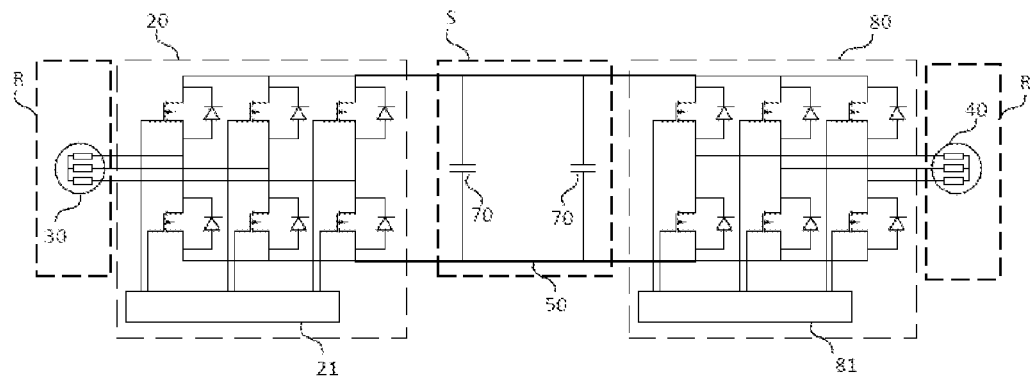
FIG. 6 illustrates the nature of the sources and impedances seen by the distribution bus of the HVDC network before the step of discharging the capacitors.

With reference to FIG. 6, the capacitors 70 become a high voltage energy source S. In the absence of an energy consuming system connected to the distribution bus 50, the electrostatic energy stored in the capacitors 70 can only be discharged by Joule effect, via the self-discharge of the capacitors 70. However, this self-discharge phenomenon is very slow, as the capacitors 70 are designed to have as little loss as possible: from several minutes to a few hours. Thus, a high residual voltage may remain on the distribution bus 50 long after all electrical systems connected thereto (rectifier 20, inverter 80 and storage device 110) have been shut down. However, during an intervention on the electrical network 10, for example for maintenance, the voltage of the distribution bus 50 must be lower than a predetermined threshold, in other words, its electrostatic energy level must be lower than a predetermined threshold to ensure the safety of the operators.

Figure 7:
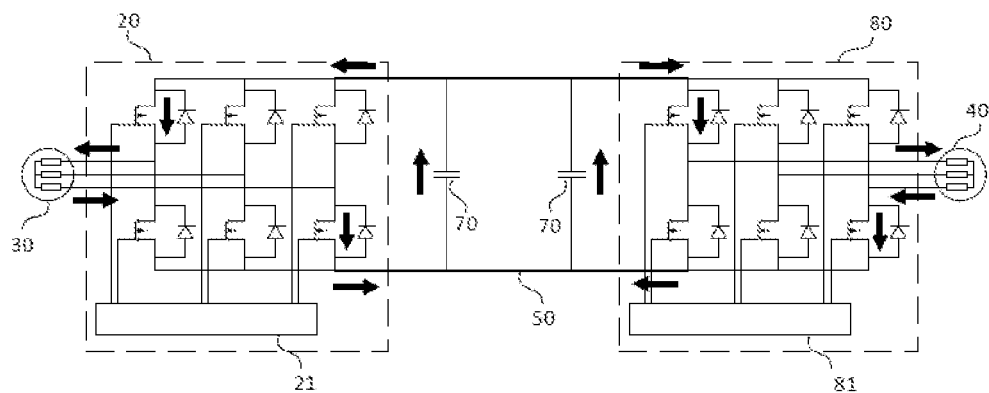
FIG. 7 illustrates the transfer of capacitive energy to the stator resistors of the HVDC network during the step of discharging the capacitors.

Still referring to FIG. 6, the generator 30 and the electric motor 40 become electrical resistors R adapted to dissipate the energy stored in the capacitors 70 by Joule effect during the discharge step of the method according to the invention. Thus, the arrows in FIG. 7 illustrate the current circulation during this discharge step, namely a transfer of capacitive energy from the capacitors 70 to the stator resistors R (the generator 30 and the electric motor 40).

The rectifier 20 and the inverter 80 integrate in their respective control device 21, 81, a specific control mode dedicated to the discharge of the capacitors. From a macroscopic point of view, this is equivalent to putting a multitude of RL-type circuits in series, one circuit corresponding to a stator phase of the electric machine 30 or 40.

Two solutions can be put in place to ensure the discharge:
- a first solution is to make a first semiconductor conductive, referred to as "top" of the inverter, for example the one connected to the phase 1, and a second semiconductor conductive, referred to as "bottom" in order to ensure the electrical continuity, for example the one connected to the phase 2 or 3;
- a second solution is to use the current control of the inverter to inject a current into the electric machine, with a value low enough not to ensure the rotation of the rotor. This current injection mode allows a sufficiently fast discharge until the voltage is too low to ensure the controllability of the inverter.

Beforehand, if energy storage devices 110 are connected to the electrical network 10, it is appropriate to disconnect them before this step of discharging the capacitors 70.

A measurement of the voltage of the distribution bus 50 provides information about the state of charge of the capacitors 70. When the voltage of the capacitors 70 is below a predetermined threshold safe for a human intervention for example, the control devices 21 and 81, respectively of the rectifier 20 and the inverter 80 control the stop of the discharge step by keeping the converters 20, 80 in the blocked state.

Figure 8:
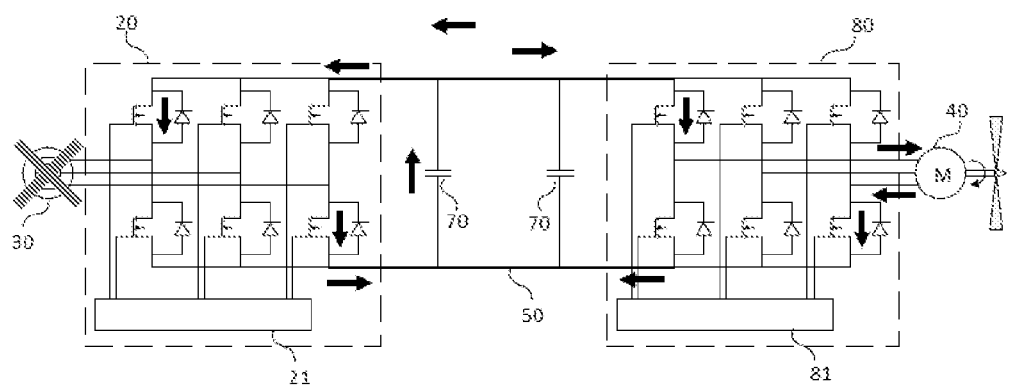
FIG. 8 illustrates the pre-charge step in the backup operating mode.

In the backup operating mode, for example subsequent to a disconnection of the energy sources 20-30 (in the event of a power supply failure, for example (gas turbine at a standstill or in a very slow speed, shutdown of the generator 30 due to a risk of overheating, etc.), the step of pre-charging the capacitors 70 is carried out by transforming a kinetic energy of the electric motor 40 and the driven load (rotor or propeller for example) into an electrical energy. This step is illustrated in FIG. 8. Thus, the block comprising the generator 30 and the rectifier 40 is unavailable, whereas the block comprising the capacitors 70 and the distribution bus 50 needs to maintain a voltage.

As the electric motors 40 are always rotating, a kinetic energy is always available in the rotors.

The inverter 80 is similar in construction to an active rectifier, so the current flowing through this inverter 80 is bidirectional. Thus, the inverter 80-electric motor 40 assembly having a kinetic energy is used to convert a part thereof into electrical energy and maintain the distribution bus voltage, in other words, maintain the charge level of the capacitors 70. The control device 81 of the inverter 80 may, for this purpose, either introduce defluxing or impose a deceleration of the rotor of the electric motor 40 in order to change the electromotive force of the electric motor 40 and thus transmit electrical energy onto the distribution bus 50 illustrated by the arrow in FIG. 8 and maintain the energy charge level of the capacitors 70.

In this backup operation phase, very little energy is available so that it is necessary to adapt the power consumed by the other loads connected to the electrical network 10 in order to maintain the charge of the capacitors 70.

The control method according to the invention can be implemented for all types of HVDC networks comprising one or more turbogenerators (turbine associated with a generator), one or more rectifiers and for example with the presence or absence of electrical storage devices, mounted in parallel on the distribution bus 50.

The invention claimed is:

1. A method for controlling an electrical power supply network for an aircraft, the electrical power supply network comprising:
- at least one generator of a turbo-alternator of the aircraft adapted to provide a source of electrical energy from a gas turbine and comprising at least one stator associated with a rectifier,
- at least one distribution bus comprising at least one capacitor,
- at least one electric motor to be powered associated with an inverter, and
- at least one energy storage means, wherein the method comprises:
- pre-charging the at least one capacitor in a normal operating mode prior to power-on of the electrical power supply network when the at least one capacitor is discharged and the gas turbine is available;
- pre-charging the at least one capacitor in a backup operating mode prior to power-on of the electrical power supply network when the at least one capacitor is discharged and the gas turbine is not available; and
- discharging the at least one capacitor at an end of use of the electrical power supply network when the at least one capacitor is charged.

2. The method according to claim 1, wherein, in the normal operating mode, pre-charging the at least one capacitor is carried out by rotating the gas turbine until a voltage of the generator reaches a predetermined threshold voltage, the turbine then being in nominal operating mode.

3. The method according claim 2, wherein pre-charging the at least one capacitor is carried out by a diode bridge of the rectifier.

4. The method according to claim 3, wherein the electrical power supply network is powered-on when the at least one capacitor is pre-charged.

5. The method according to claim 4, wherein, when a voltage of the electrical power supply network is powered-on, a voltage of the distribution bus is adapted to a no-load voltage of at least one electrical storage device.

6. The method according to claim 1, wherein in the backup operating mode, pre-charging the at least one capacitor is carried out by changing an electromotive force of the at least one electric motor and by controlling the inverter so as to transform a kinetic energy of the electric motor into electrical energy.

7. The method according to claim 1, wherein discharging the at least one capacitor is carried out by dissipating electrical energy of the at least one capacitor by an impedance of the electrical power supply network.

8. The method according to claim 7, wherein dissipation of the electrical energy of the at least one capacitor is obtained by connecting, in series, stator resistors of the at least one electric motor and of the at least one generator.

9. The method according to claim 8, wherein pre-charging the at least one capacitor in the backup operating mode comprises a preliminary step of disconnecting at least one electrical storage device.

* * * * *